(12) United States Patent
Thrasher

(10) Patent No.: US 9,463,780 B2
(45) Date of Patent: Oct. 11, 2016

(54) BRAKE SYSTEM AND METHOD OF OPERATING

(71) Applicant: Robert Bosch GmbH, Stuttgart (DE)

(72) Inventor: Mark Thrasher, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 13/962,154

(22) Filed: Aug. 8, 2013

(65) Prior Publication Data

US 2014/0346852 A1 Nov. 27, 2014

Related U.S. Application Data

(60) Provisional application No. 61/825,737, filed on May 21, 2013.

(51) Int. Cl.
*B60T 7/04* (2006.01)
*B60T 13/14* (2006.01)
*B60T 13/66* (2006.01)
*B60T 13/68* (2006.01)
*B60T 8/40* (2006.01)

(52) U.S. Cl.
CPC .............. *B60T 7/042* (2013.01); *B60T 8/4081* (2013.01); *B60T 13/146* (2013.01); *B60T 13/662* (2013.01); *B60T 13/686* (2013.01)

(58) Field of Classification Search
None
See application file for complete search history.

(56) References Cited

U.S. PATENT DOCUMENTS

| | | | | |
|---|---|---|---|---|
| 4,729,611 A * | 3/1988 | Kircher et al. | ............ | 303/116.1 |
| 5,277,483 A * | 1/1994 | Yosida et al. | ............... | 303/113.2 |
| 5,288,142 A * | 2/1994 | Burgdorf | ................... | 303/113.2 |
| 5,738,419 A * | 4/1998 | Sekiguchi | ................. | 303/115.4 |
| 5,988,769 A * | 11/1999 | Inagaki et al. | ............. | 303/117.1 |
| 6,003,957 A * | 12/1999 | Toda et al. | ....................... | 303/10 |
| 6,188,947 B1 * | 2/2001 | Zhan | ............................... | 701/71 |
| 6,189,982 B1 | 2/2001 | Harris et al. | | |
| 6,302,497 B1 * | 10/2001 | Takayama | .................. | 303/114.1 |
| 6,499,812 B1 * | 12/2002 | Gronau et al. | ............. | 303/113.1 |
| 6,692,087 B1 * | 2/2004 | Wolff | .............................. | 303/10 |
| 6,837,552 B2 | 1/2005 | Reuter et al. | | |
| 6,896,338 B2 | 5/2005 | Nakayasu et al. | | |
| 7,469,974 B2 | 12/2008 | Maki et al. | | |

(Continued)

FOREIGN PATENT DOCUMENTS

DE 102010029851 12/2011

*Primary Examiner* — Robert A Siconolfi
*Assistant Examiner* — James Hsiao
(74) *Attorney, Agent, or Firm* — Michael Best & Friedrich LLP

(57) ABSTRACT

A vehicle braking system includes a master cylinder coupled to a brake pedal and establishing fluid communication to wheel cylinder(s) of primary and secondary circuits via respective outputs. A pressure sensor detects actual, non-boosted demand pressure. Each circuit includes a motor-driven pump defining pressure and suction sides, inlet and outlet valves, a normally-open isolation valve, and a normally-closed apply pressure control valve. A pedal feel simulator receives hydraulic fluid from the master cylinder when the isolation valves are closed. A controller receives a signal from the pressure sensor and generates corresponding control signals for the motor-driven pump and the apply pressure control valve of each circuit to pressurize the pressure side of each circuit equal to the sensed demand pressure plus a predetermined boost factor, and the actual pressure at each wheel cylinder is configured for individual manipulation by selective opening and closing of the inlet and outlet valves.

17 Claims, 15 Drawing Sheets

(56) References Cited

U.S. PATENT DOCUMENTS

| | | | |
|---|---|---|---|
| 7,497,528 B2 | 3/2009 | Reuter et al. | |
| 8,287,054 B2* | 10/2012 | Beer | 303/10 |
| 2005/0021210 A1* | 1/2005 | Bond et al. | 701/78 |
| 2006/0087173 A1* | 4/2006 | Kajiyama et al. | 303/3 |
| 2008/0284242 A1 | 11/2008 | Ganzel | |
| 2009/0001805 A1* | 1/2009 | Schick et al. | 303/9.61 |
| 2010/0276240 A1* | 11/2010 | Wuerth et al. | 188/358 |
| 2013/0057052 A1* | 3/2013 | Kunz et al. | 303/3 |
| 2013/0062931 A1 | 3/2013 | Kunz et al. | |
| 2015/0061358 A1* | 3/2015 | Maruo et al. | 303/3 |

\* cited by examiner

BRAKE SYSTEM AND METHOD OF OPERATING

CROSS-REFERENCE TO RELATED APPLICATIONS

This application claims priority to U.S. Provisional Patent Application No. 61/825,737 filed May 21, 2013, the entire contents of which are incorporated by reference herein.

BACKGROUND

The present invention relates to vehicle brake systems. Generally, brake systems require a dedicated booster device to provide brake force amplification so that the brake force exceeds the input force from a driver's foot on a brake pedal under normal operation. In conventional vehicles with internal combustion engines, the booster device is most typically a vacuum booster. However, in alternative vehicles (e.g., electric vehicles) vacuum from an internal combustion engine may not be available. Thus, brake boost must be provided by other means, such as an electro-mechanical device or a high pressure accumulator. For example, in a full-power brake system (also referred to as a "decoupled" or "brake-by-wire" system) in which driver applied force is not used whatsoever to produce the actual braking force to the brake devices, a high pressure accumulator is provided to store a quantity of hydraulic fluid pumped to a high pressure for on-demand application to the brakes. Although satisfactory for the intended purpose, the accumulator adds complexity to the system and inherent component and assembly cost. Furthermore, many vehicles with internal combustion engines have recently adopted direct injection technology, in which vacuum levels may not be sufficient for a conventional vacuum brake booster. This can necessitate the addition of a vacuum pump to generate sufficient vacuum for a brake booster.

SUMMARY

In one aspect, the invention provides a vehicle braking system including a master cylinder configured to receive an input from a brake pedal. The master cylinder has an outlet for a primary circuit including at least one wheel cylinder operable to provide a braking force on a wheel when supplied with pressurized hydraulic fluid, and an outlet for a secondary circuit including at least one wheel cylinder operable to provide a braking force on a wheel when supplied with pressurized hydraulic fluid. A pressure sensor is operable to detect an actual, non-boosted driver demand pressure generated at one of the master cylinder outputs from depression of the brake pedal. At least one pump is provided in each of the primary circuit and the secondary circuit to define a pressure side and a suction side of each of the respective primary and secondary circuits. An inlet valve is positioned adjacent each wheel cylinder on the pressure side of each of the primary circuit and the secondary circuit, and an outlet valve is positioned adjacent each wheel cylinder on the suction side of each of the primary circuit and the secondary circuit. A normally open isolation valve is positioned between each master cylinder output and the pressure side of the respective primary circuit and the secondary circuit. Each isolation valve is movable between an open position that allows fluid communication and a closed position that blocks fluid communication. A pedal feel simulator is configured to receive hydraulic fluid from the master cylinder to provide a reaction force to the brake pedal when the isolation valves of the primary and secondary circuits are closed. At least one motor is operable to drive the pumps of the primary and secondary circuits to generate hydraulic fluid pressure in the pressure side for supplying to the respective wheel cylinders through the respective inlet valves. A normally closed apply pressure control valve is positioned in each of the primary circuit and the secondary circuit between the pressure side and the suction side of the respective circuit, each apply pressure control valve being movable between a closed position in which the full hydraulic fluid pressure at the pressure side is provided to the respective inlet valve and an open position in which the pressure provided to the respective inlet valve is reduced in comparison to that at the pressure side. A controller is operable to receive a signal from the pressure sensor and to generate corresponding control signals for the at least one motor and the apply pressure control valves of each of the primary and secondary circuits to produce a hydraulic fluid pressure in the pressure side of each of the primary and secondary circuits equal to the sensed driver demand pressure plus a predetermined boost factor, and the actual pressure at each wheel cylinder is configured for individual manipulation by selective opening and closing of the associated inlet and outlet valves.

In another aspect, the invention provides a method of operating a vehicle braking system. Primary and secondary circuits are provided, each including at least one wheel cylinder operable to provide a braking force on a wheel when supplied with pressurized hydraulic fluid, the primary and secondary circuits being in selective fluid communication with respective outputs of a master cylinder. An inlet valve is provided positioned adjacent each wheel cylinder on a pressure side of each of the primary circuit and the secondary circuit, and an outlet valve is provided positioned adjacent each wheel cylinder on a suction side of each of the primary circuit and the secondary circuit. An input from a brake pedal is received at the master cylinder. The pressure side of both the primary and secondary circuits is isolated from the master cylinder outputs and fluid communication is established between at least one of the master cylinder outputs and a pedal feel simulator. An actual, non-boosted driver demand pressure generated at one of the master cylinder outputs from depression of the brake pedal is detected. Both a pump(s) provided in each of the primary circuit and the secondary circuit is operated and a normally closed apply pressure control valve positioned in each of the primary circuit and the secondary circuit are modulated with respective signals corresponding to the detected driver demand pressure to produce a hydraulic fluid pressure in the pressure side of each of the primary and secondary circuits equal to the sensed driver demand pressure plus a predetermined boost factor. The actual pressure at at least one individual wheel cylinder is modulated by selective opening and closing of the associated inlet and outlet valves.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
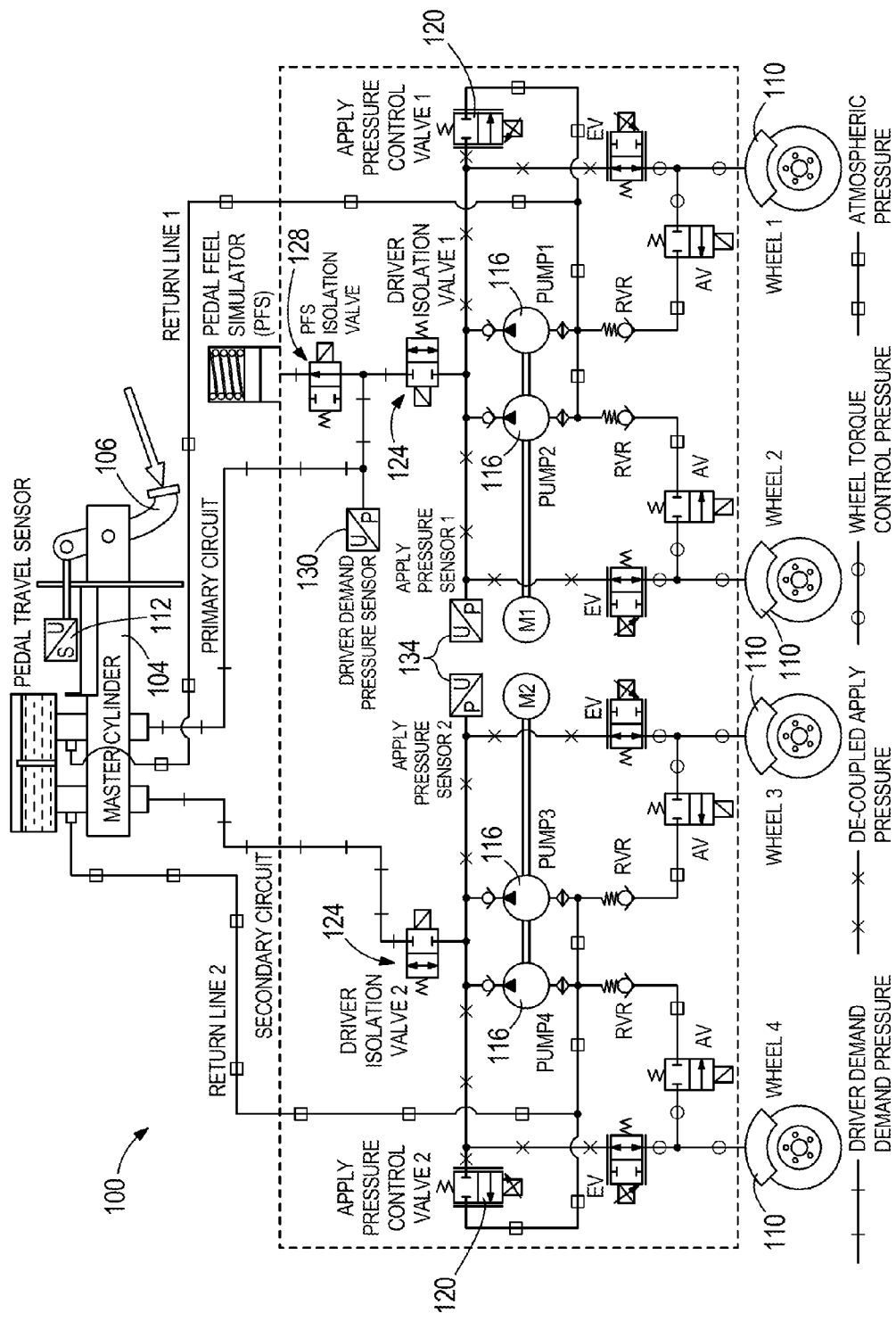
FIG. 1 is a schematic drawing of a braking system according to one aspect of the present invention. A normal braking mode is illustrated.

The braking system 100 of FIG. 1 includes a master cylinder 104 coupled to a brake pedal 106 to pressurize hydraulic fluid therein. The master cylinder 104 includes dual outputs to provide fluid to a primary circuit and a secondary circuit. In the illustrated construction, each of the circuits includes a pair of brake devices or wheel cylinders 110. The wheel cylinders 110 of a particular circuit can be associated with a set of front wheels, a set of rear wheels, or a set of diagonal wheels. A pedal travel sensor 112 is coupled to the brake pedal 106 and is operable to detect an amount of travel of the brake pedal 106, so that a corresponding signal can be sent to a controller (not shown). Each circuit includes an inlet valve EV and an outlet valve AV associated with each wheel cylinder 110. A check valve RVR adjacent each outlet valve AV ensures one-way flow of fluid through the outlet valve AV, which is away from the wheel cylinder 110. One or more pumps 116 are provided in each circuit, each pump 116 having a suction side adjacent the outlet valve AV and the check valve RVR associated with each wheel cylinder 110 of the circuit. A pressure side of each pump 116 is provided in fluid communication with the inlet valves EV to provide pressurized fluid to the inlet valves EV, and through the inlet valves EV (when open) to the wheel cylinders 110 when the pump(s) 116 are operated by a motor. In the illustrated construction a first electric motor M1 is provided to drive two pumps 116 in the primary circuit and a second electric motor M2 is provided to drive two pumps 116 in the secondary circuit. Alternate arrangements may be provided, some of which are discussed below. Each of the pumps 116 can be a variable speed pump, operable to generate a variable output corresponding to a variable drive speed from the associated motor M1, M2.

A first apply pressure control valve 120 is provided in parallel with the pumps 116 of the primary circuit and a second apply pressure control valve 120 is provided in parallel with the pumps 116 of the secondary circuit. The apply pressure control valves 120 can be modulated solenoid valves (e.g., having a range of open positions, or receiving a pulse-width modulation signal to achieve a similar effect). A driver isolation valve 124 is positioned in each circuit between the master cylinder output and the inlet valves EV such that movement of hydraulic fluid from the master cylinder 104 can be selectively enabled and selectively blocked. The driver isolation valves 124 can be normally-open switched solenoid valves. During normal (powered) operation, the driver isolation valves 124 are closed so that the depression of the brake pedal 106 does not directly apply braking force to the wheel cylinders 110 through the hydraulic fluid. Rather, the fluid displaced from the master cylinder 104 is directed to a pedal feel simulator PFS to mimic the feel and travel present during braking of a conventional braking system. The pedal feel simulator PFS is coupled to one of the master cylinder outputs via a simulator isolation valve (e.g., a normally-closed switched solenoid valve) 128 in parallel with one of the driver isolation valves 124. The simulator isolation valve 128 is open during normal (powered) operation. A pressure sensor 130 is provided in the shared supply line to the master cylinder side (or "upstream" side) of the simulator isolation valve 128 and the driver isolation valve 124 in fluid communication with one of the master cylinder outputs. The pressure sensor 130 is operable to detect a driver demand pressure and output a corresponding signal.

When brake pedal actuation is detected by the pedal travel sensor 112, the driver isolation valves 124 are actuated to close and the simulator isolation valve 128 is actuated to open. As pedal feedback is provided by the pedal feel simulator PFS, a braking force (i.e., hydraulic fluid pressure) corresponding to the driver's demand, as sensed by the pressure sensor 130, is generated by the pumps 116 in each circuit and applied to the corresponding wheel cylinders 110 through the apply pressure control valves 120. The output of the pumps 116 is controlled by controlling the running speed of the motors M1, M2 and modulating the apply pressure control valves 120 to achieve a braking force at the wheel cylinders 110 that equals the driver demand pressure as sensed by the sensor 130, plus a predetermined boost amount. Feedback of the actual pressure generated at the outlet of the pumps 116 is provided by a pressure sensor 134 in each circuit. Thus, no dedicated booster device is required to achieve boosted braking, and the system responds to modulate braking force at the wheel cylinders 110 without a high pressure accumulator, since the pump output can simply be raised in real time in response to a sudden demand increase (from driver demand or vehicle demand in the case of autonomous braking). This can be accomplished by modulating the apply pressure control valve(s) 120, and in some cases also increasing the running speed of the motor(s)

M1, M2. In some constructions, the running speed of the motor(s) M1, M2 may be set in relation to the initial brake pedal travel detected by the sensor 112, and may remain substantially constant for the braking event, with precision pressure control carried out by the apply pressure control valves 120. Of course, a dramatic increase in pedal travel beyond a threshold during a braking event may result in increasing motor speed. It should also be noted that the motor(s) and the apply pressure control valves 120 can be controlled in response to the signal from the pedal travel sensor 112 (e.g., if the pressure sensor 130 fails).

Figure 11:
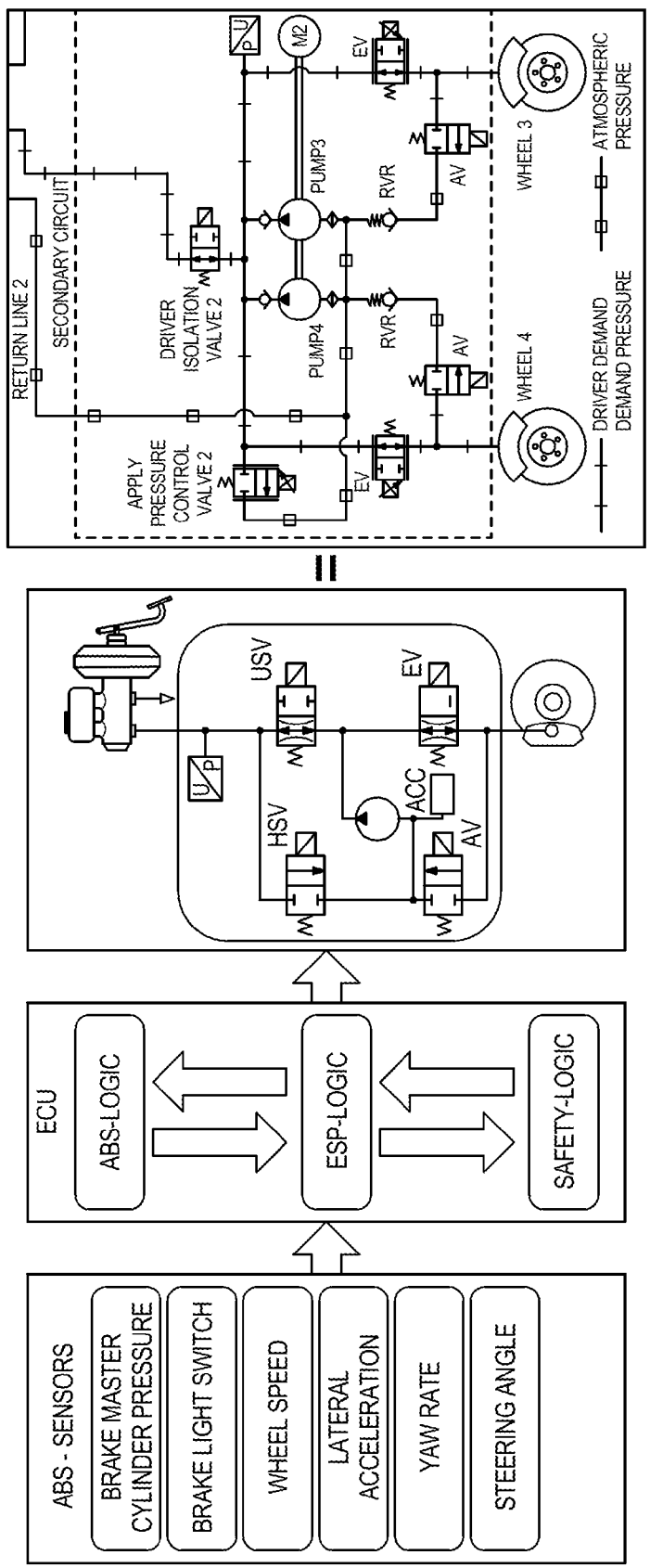
FIG. 11 is a schematic view illustrating how anti-lock braking (ABS) sensors are monitored by an electronic control unit to control the system components and ultimately the operational state of the braking system.
Figure 12:
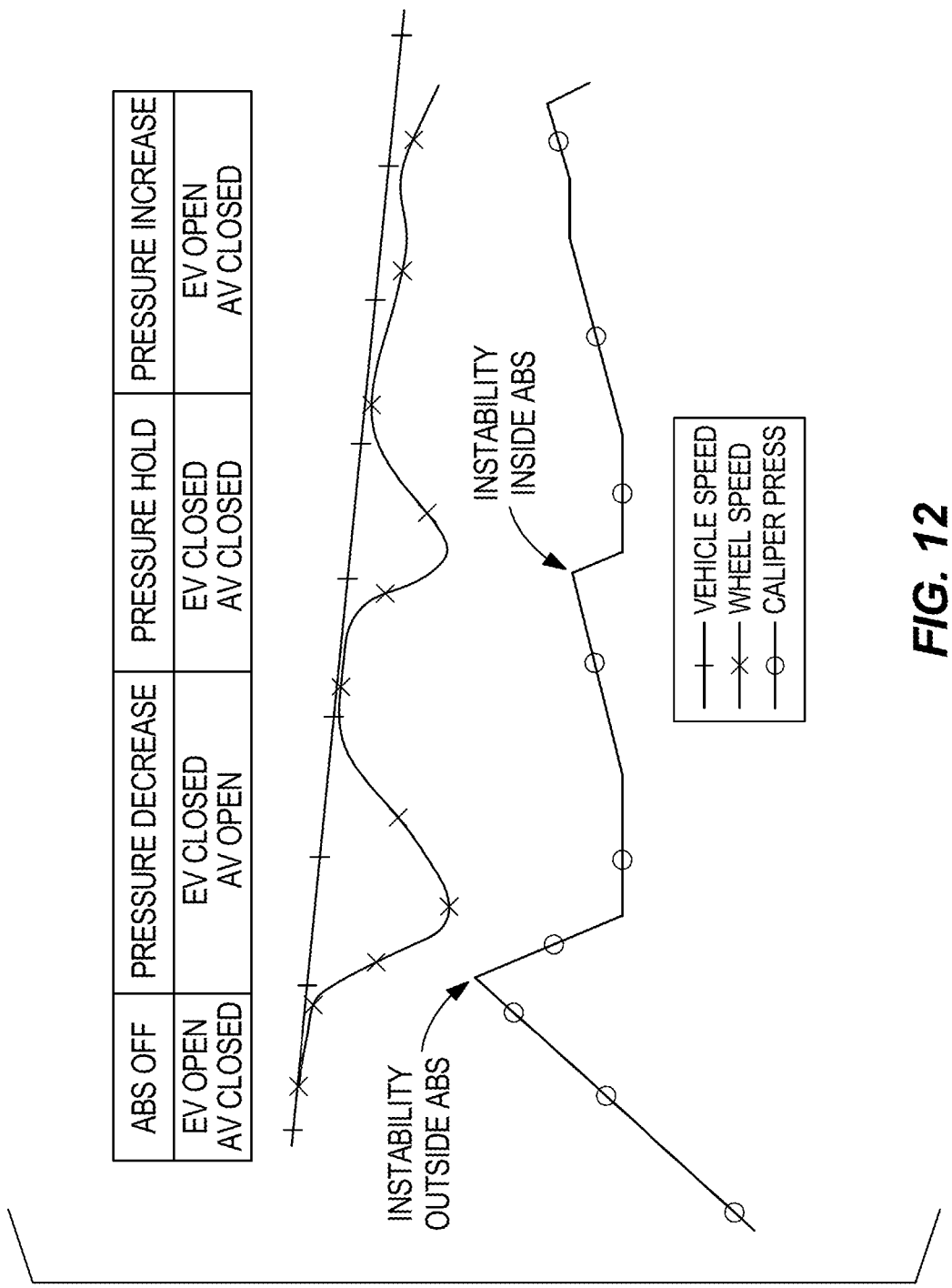
FIG. 12 illustrates the various intervention states for ABS and a graphical representation of an exemplary ABS deceleration event.

When both wheel cylinders 110 of a given circuit require the same pressure level, setting of the pressure can be accomplished with the apply pressure control valve 120, while each inlet valve EV remains in its open, non-actuated state and each outlet valve AV remains in its closed, non-actuated state. The inlet valves EV and outlet valves AV are able to provide ABS and ESP function according to their normal operation in a conventional system. The operation is described in some detail in FIGS. 11-13. FIG. 11 generally illustrates how information from various ABS sensors is communicated to an ECU, which in turn, controls the motor-driven pumps 116 and the valves within one or more braking circuits to effect a particular brake system state to achieve a desired braking action. FIG. 12 illustrates an ABS control strategy which prevents wheel lock-up by modulating the wheel caliper pressure using the inlet and outlet valves EV, AV. The table in FIG. 12 shows various ABS intervention states and the corresponding valve positions for the inlet and outlet valves EV, AV. The graph in FIG. 12 includes plots of vehicle reference speed, actual wheel speed, and caliper pressure versus time for a deceleration event. Initially, caliper pressure builds with the inlet valve EV open and the outlet valve AV closed. When wheel speed is sensed to deviate from vehicle reference speed (indicative of impending lock-up), the caliper pressure is reduced by closing the inlet valve EV to prevent further pressure generated from the driver from entering the wheel caliper, and by opening the outlet valve AV. The system then enters a pressure hold state where both the inlet and outlet valves EV, AV are closed and a particular caliper pressure is maintained. Although the wheel speed returns to match the vehicle reference speed in this state, the wheel speed may exceed the desired brake deceleration estimated by the system. To keep the vehicle at the desired brake level, pressure must be increased, which is accomplished by opening the inlet valve EV, while the outlet valve AV remains closed. If the wheel speed again deviates significantly below vehicle reference speed, pressure at the wheel caliper is relieved by closing the inlet valve EV and opening the outlet valve AV, and the cycle of decreasing, holding, and increasing caliper pressure is repeated as necessary to decelerate the vehicle. Of course, if the wheel speed does not deviate below the vehicle reference speed, ABS intervention not needed, as the desired deceleration is being met without impending wheel lock-up in those circumstances.

Figure 13:
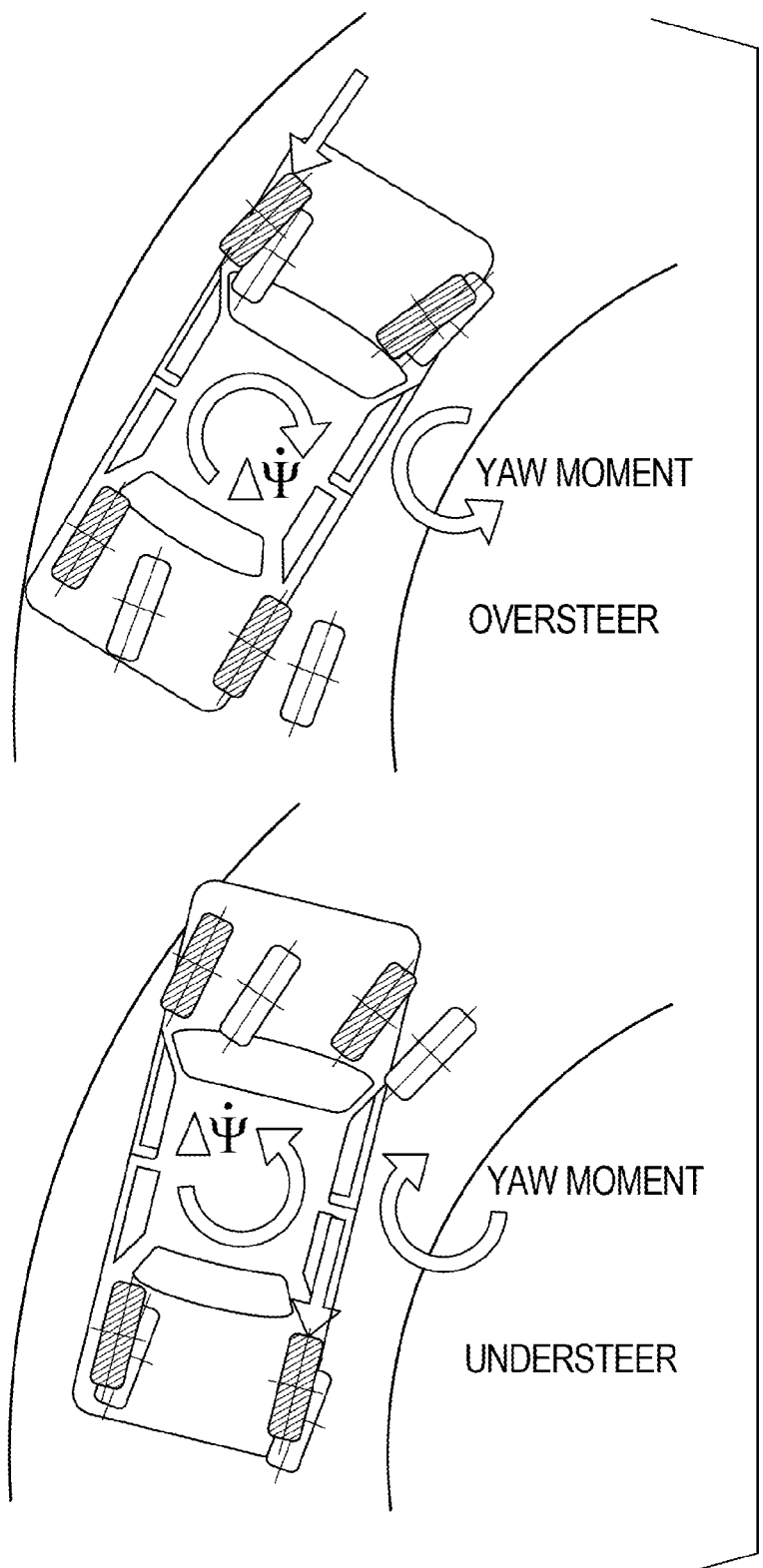
FIG. 13 illustrates the basic oversteer and understeer conditions addressed by electronic stability control (ESP) intervention.
Figure 14:
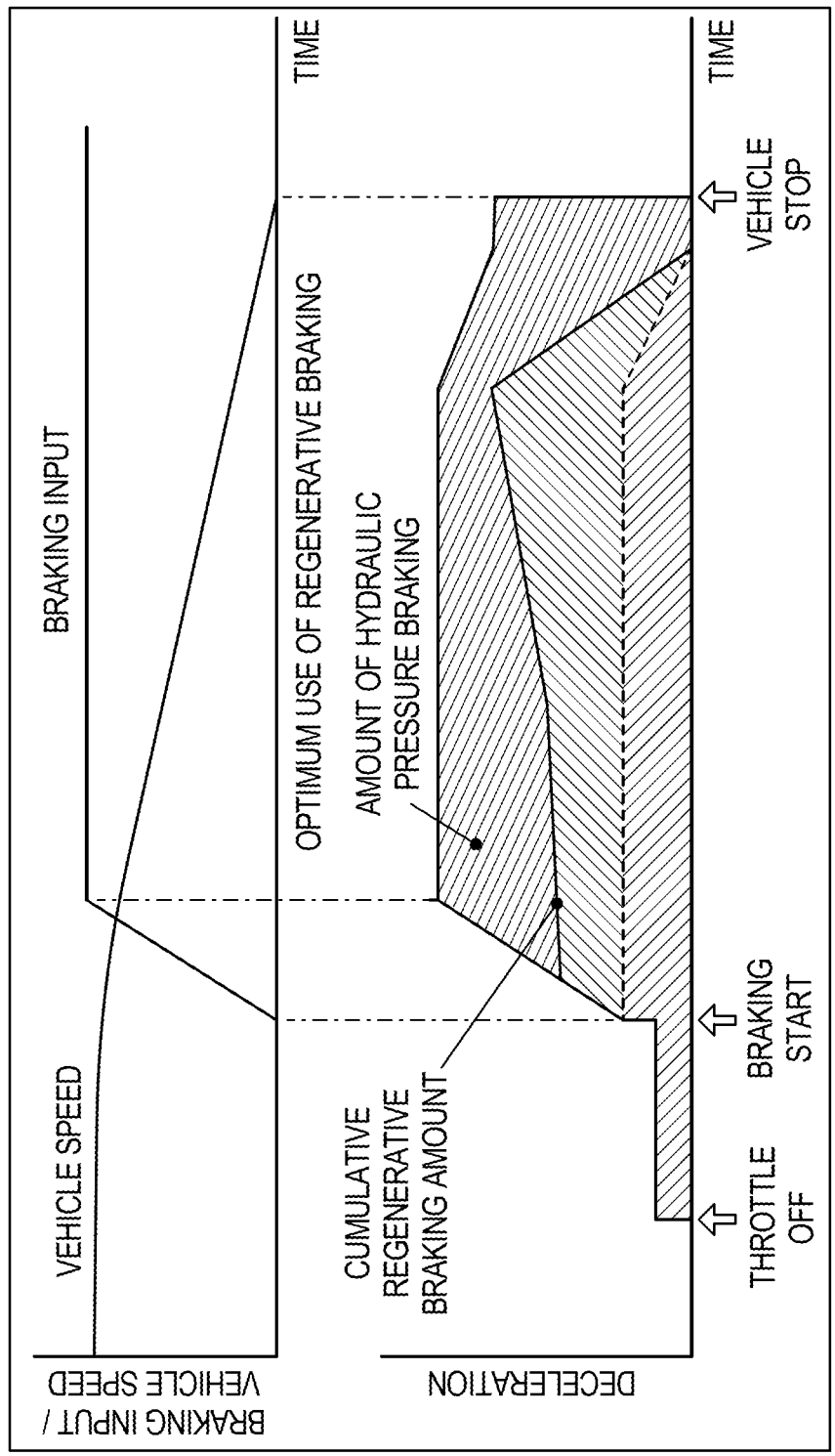
FIG. 14 illustrates a control strategy for brake blending between hydraulic braking and alternative braking for a brake system according to the present invention.

FIG. 13 illustrates both an oversteer scenario and an understeer scenario, and the corrective yaw moment from the ESP function of the braking system that is required to correct each condition. Upon oversteer (upper portion of FIG. 13), the vehicle is spinning (i.e., the rear axle of the vehicle is sliding toward the outside of the curve) because the yaw velocity is too large. Stabilization is imparted by controlled brake intervention at the front wheel at the outside of the curve. Upon understeer (lower portion of FIG. 13), the front axle of the vehicle is sliding toward the outside of the curve because the yaw velocity is too small. Stabilization is imparted by controlled brake intervention at the rear wheel at the inside of the curve.

In a case where only one wheel of a given circuit requires braking pressure (e.g., in an autonomous stability control intervention), the demand pressure may be achieved by controlled operation of the pump(s) 116 and the apply pressure control valve 120, and the wheel cylinder 110 not requiring the braking pressure can simply be blocked by closing the associated inlet valve EV. When two different brake pressures are required at the wheel cylinders 110 of a given circuit, the higher pressure may be achieved directly by the pump(s) 116 and the apply pressure control valve 120 of the circuit for applying directly to one of the wheel cylinders 110 (without actuation of the inlet and outlet valves EV, AV) and the lower pressure to be delivered to another wheel cylinder 110 of the circuit may be achieved by modulating at least one of the inlet and outlet valves EV, AV to apply a pressure to the wheel cylinder 110 that is less than the pressure from the apply pressure control valve 120. For example, this may occur when a wheel cylinder for a front wheel and a wheel cylinder for a rear wheel are provided in the same circuit (X-split), in which the pressure to the wheel cylinder for the rear brake has a lower threshold for lock-up than the front.

Figure 2:
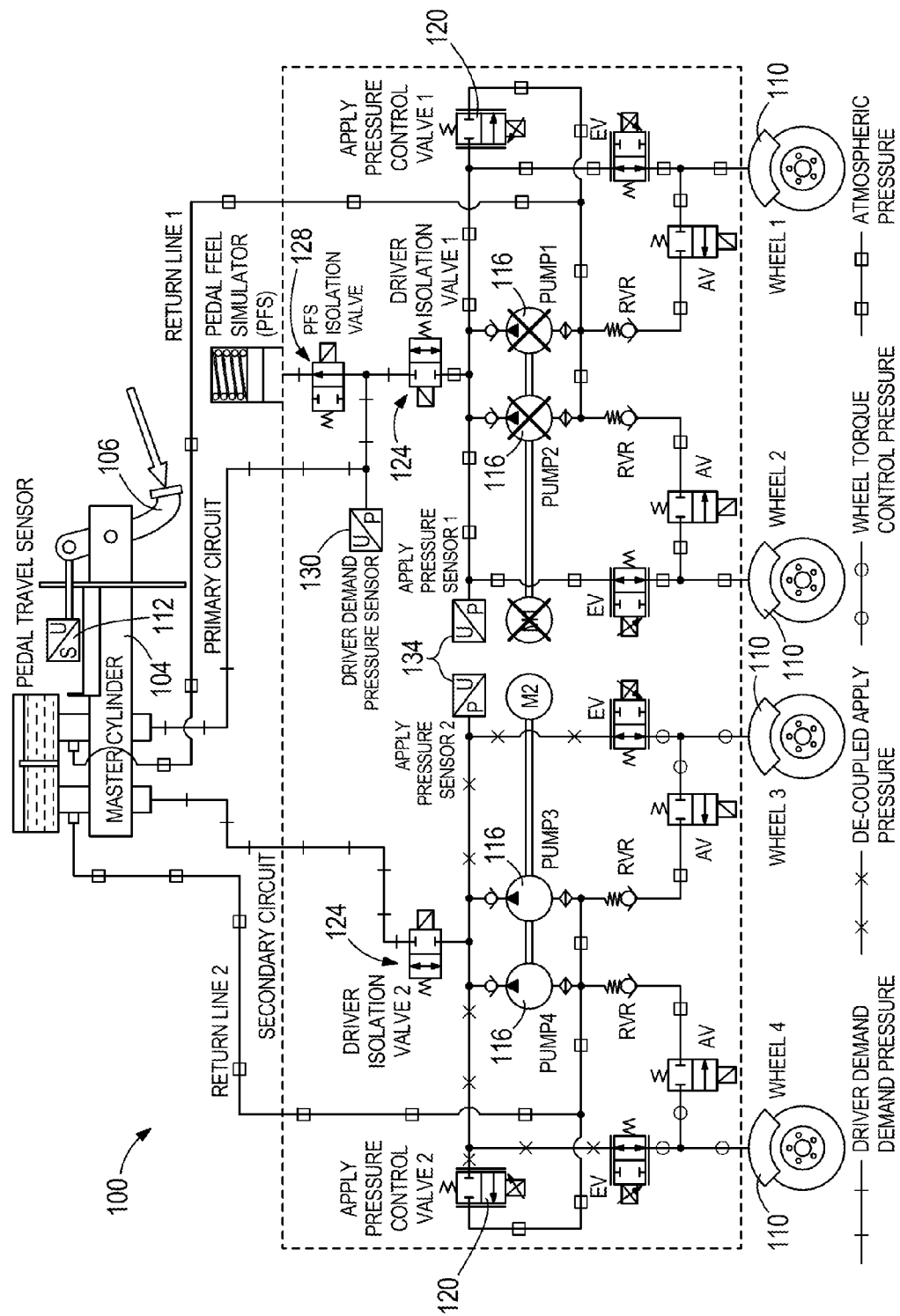
FIG. 2 is a schematic drawing of the braking system of FIG. 1. A braking mode for a failed primary circuit motor is illustrated.
Figure 3:
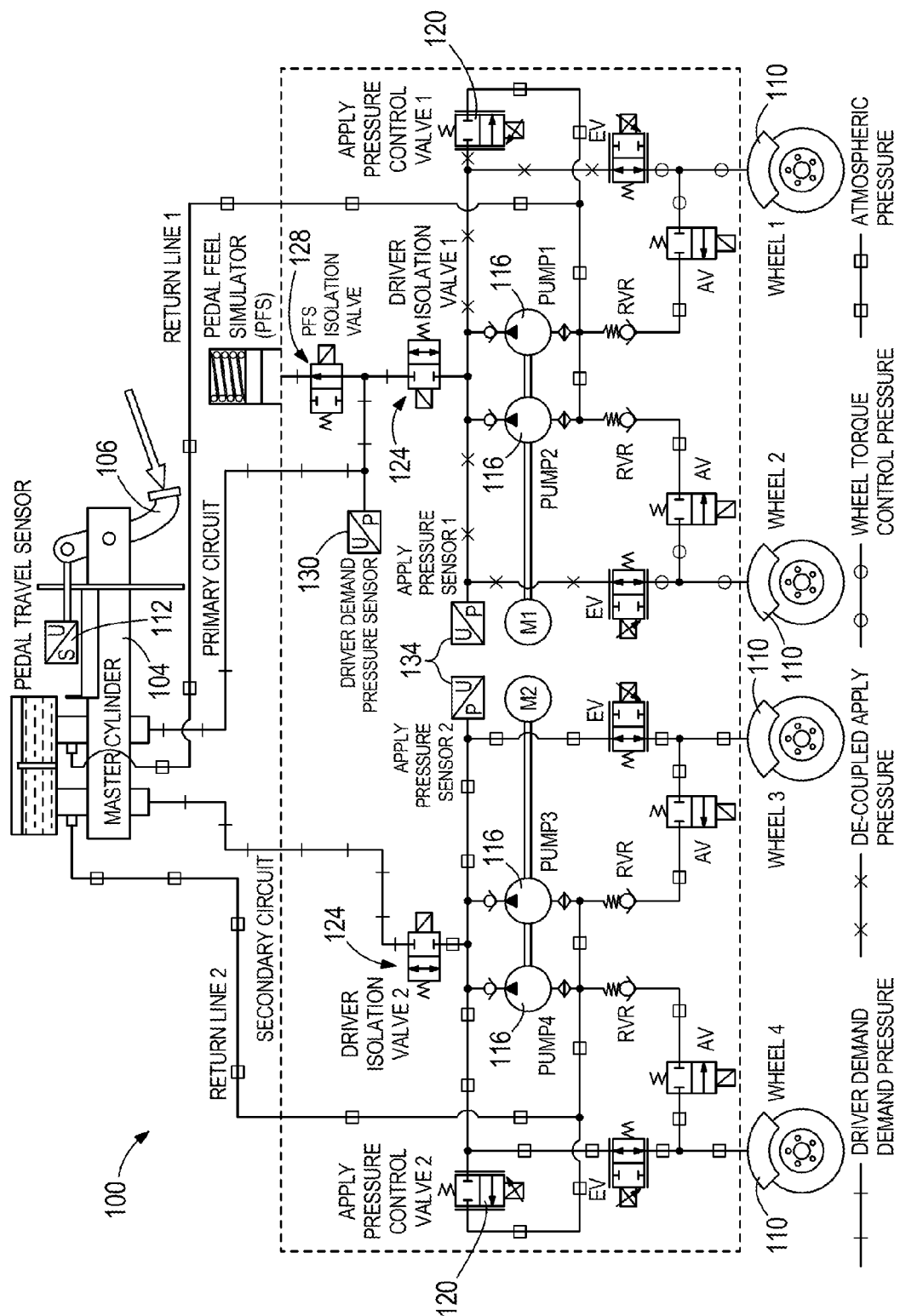
FIG. 3 is a schematic drawing of the braking system of FIG. 1. A braking mode for a failed secondary circuit motor is illustrated.
Figure 4:
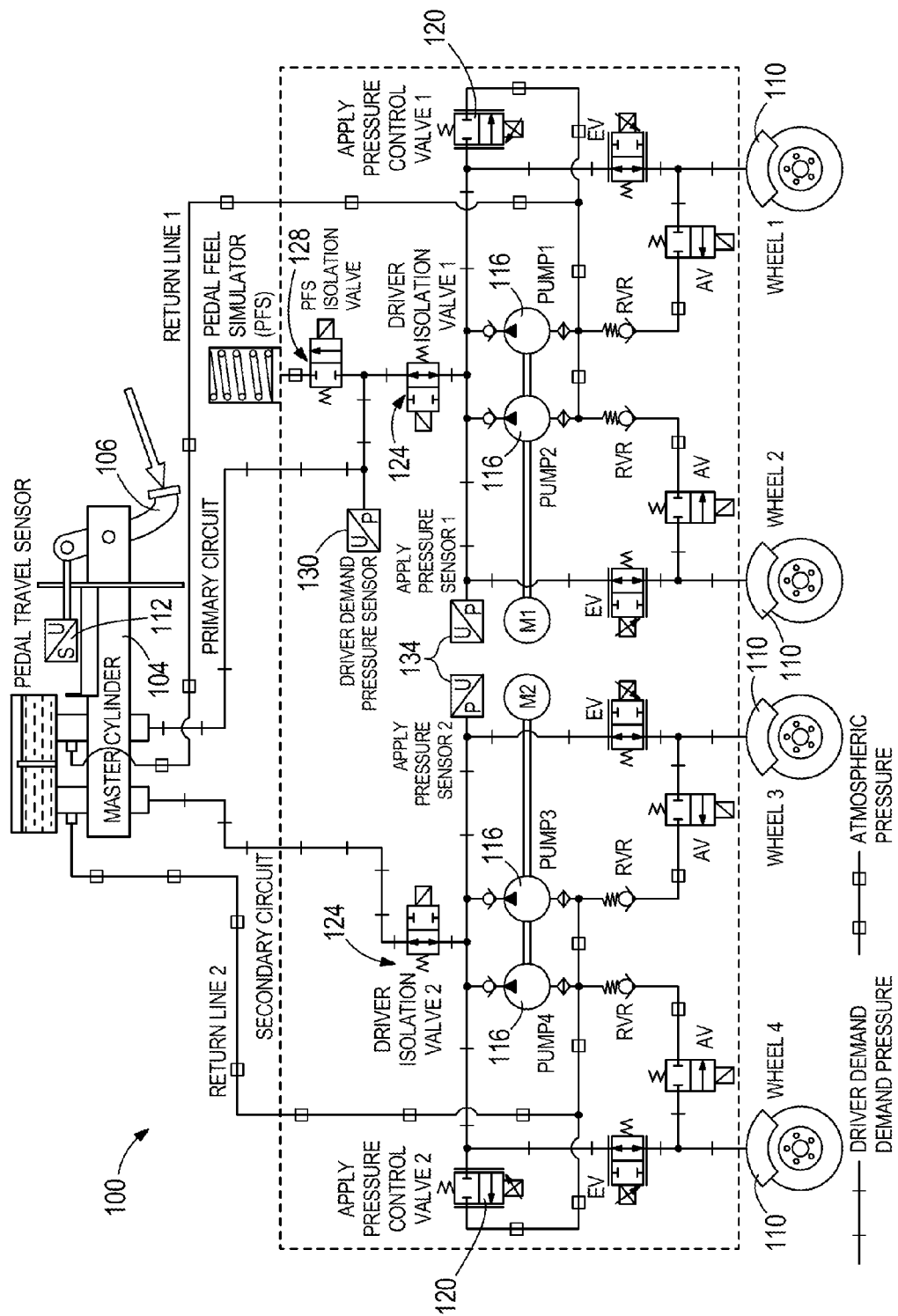
FIG. 4 is a schematic drawing of the braking system of FIG. 1. A braking mode for a full power failure is illustrated.
Figure 5:
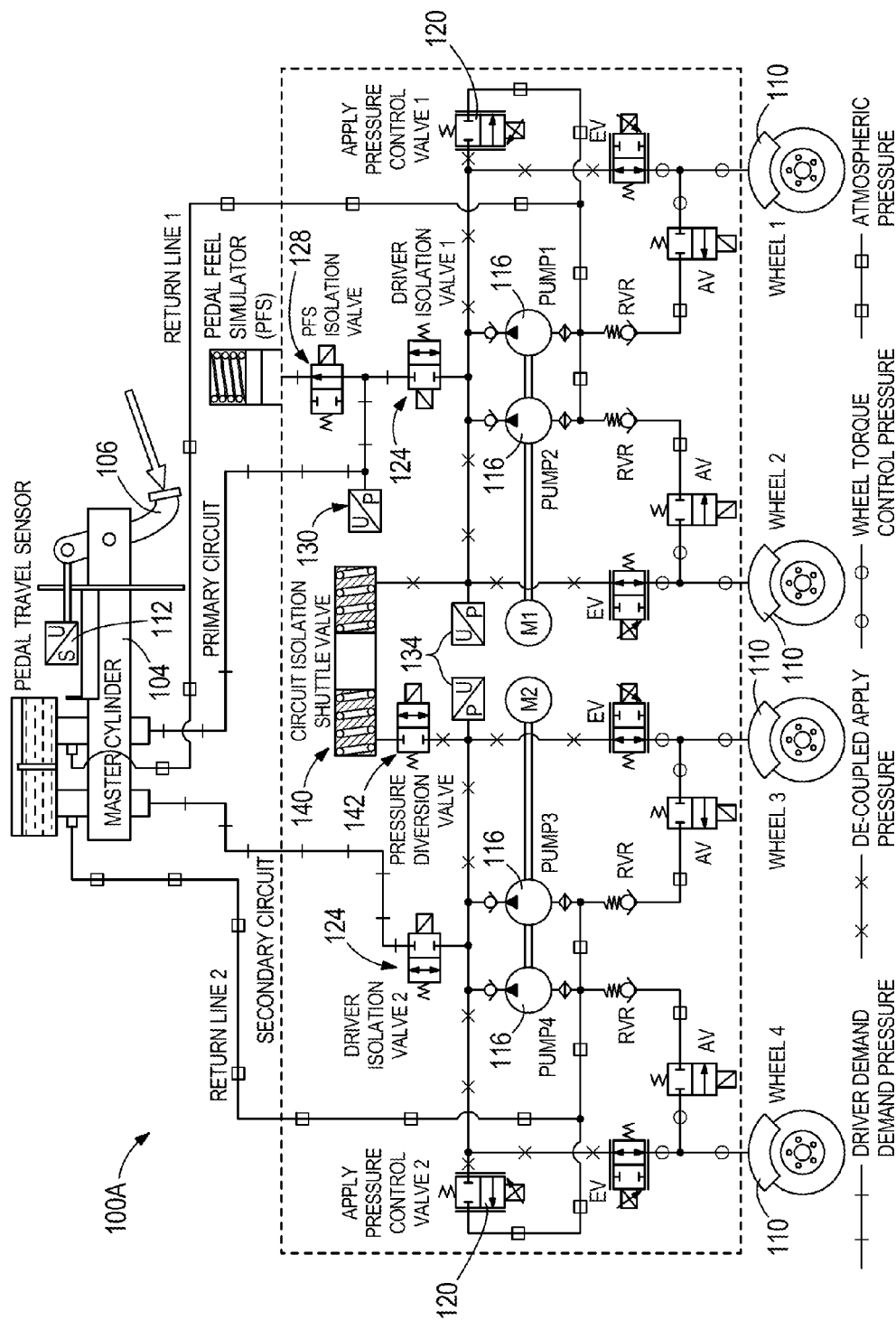
FIG. 5 is a schematic drawing of a braking system according to one aspect of the present invention, including a circuit isolation shuttle valve. A normal braking mode is illustrated.

In the event that one of the motors M1, M2 fails or loses power, the opposite circuit is still able to apply boosted braking as normal with a set of wheel cylinders 110. This situation is illustrated in FIGS. 2 and 3. With respect to a full system power failure, FIG. 4 illustrates that a failsafe braking mode will be enacted, in which all valves assume their naturally biased state and the braking force generated by the driver's actuation of the brake pedal 106 is transferred from the master cylinder 104 to the wheel cylinders 110 of both circuits. In other words, the driver isolation valves 124 are biased open, the simulator isolation valve 128 is biased closed, and the apply pressure control valves 120 are biased closed. All inlet valves EV are biased open and all outlet valves AV are biased closed. Although no boost is present, the master cylinder 104 geometry is designed to provide adequate braking power to all wheel cylinders 110.

Figure 6:
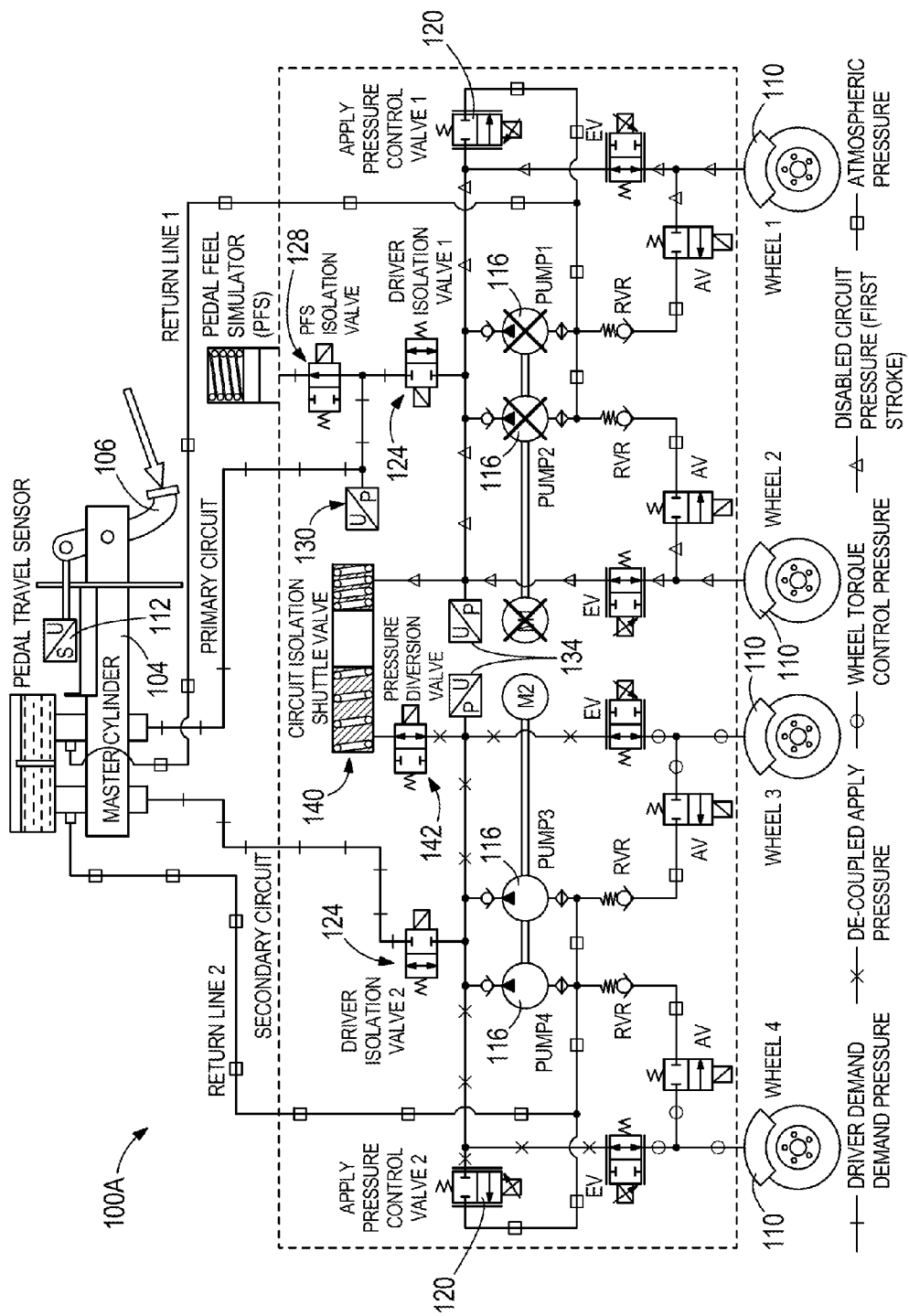
FIG. 6 is a schematic drawing of the braking system of FIG. 5. The circuit isolation shuttle valve is stroked during failure of a primary circuit motor.
Figure 7:
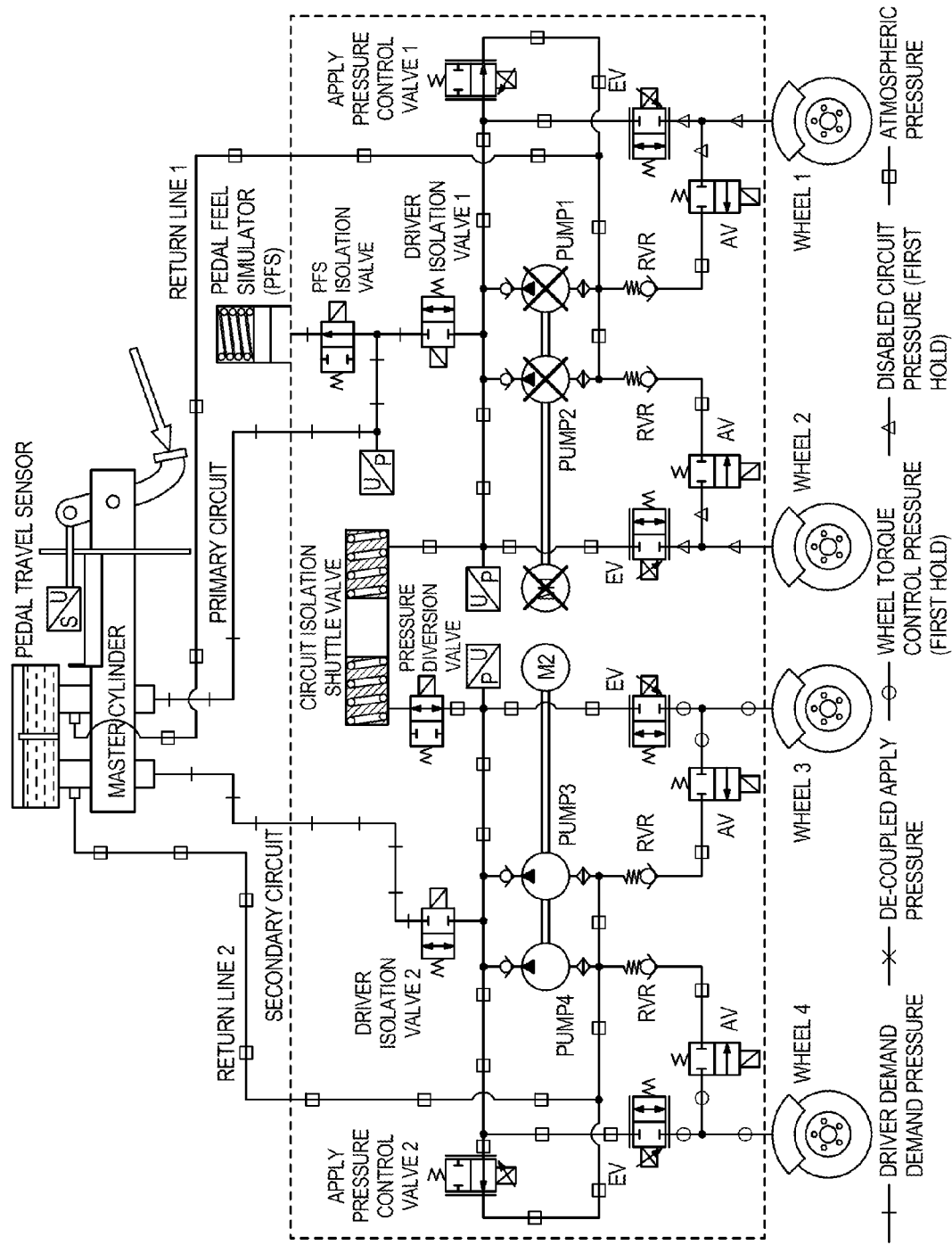
FIG. 7 is a schematic drawing of the braking system of FIG. 5. The circuit isolation shuttle valve is re-centered during failure of a primary circuit motor.
Figure 8:
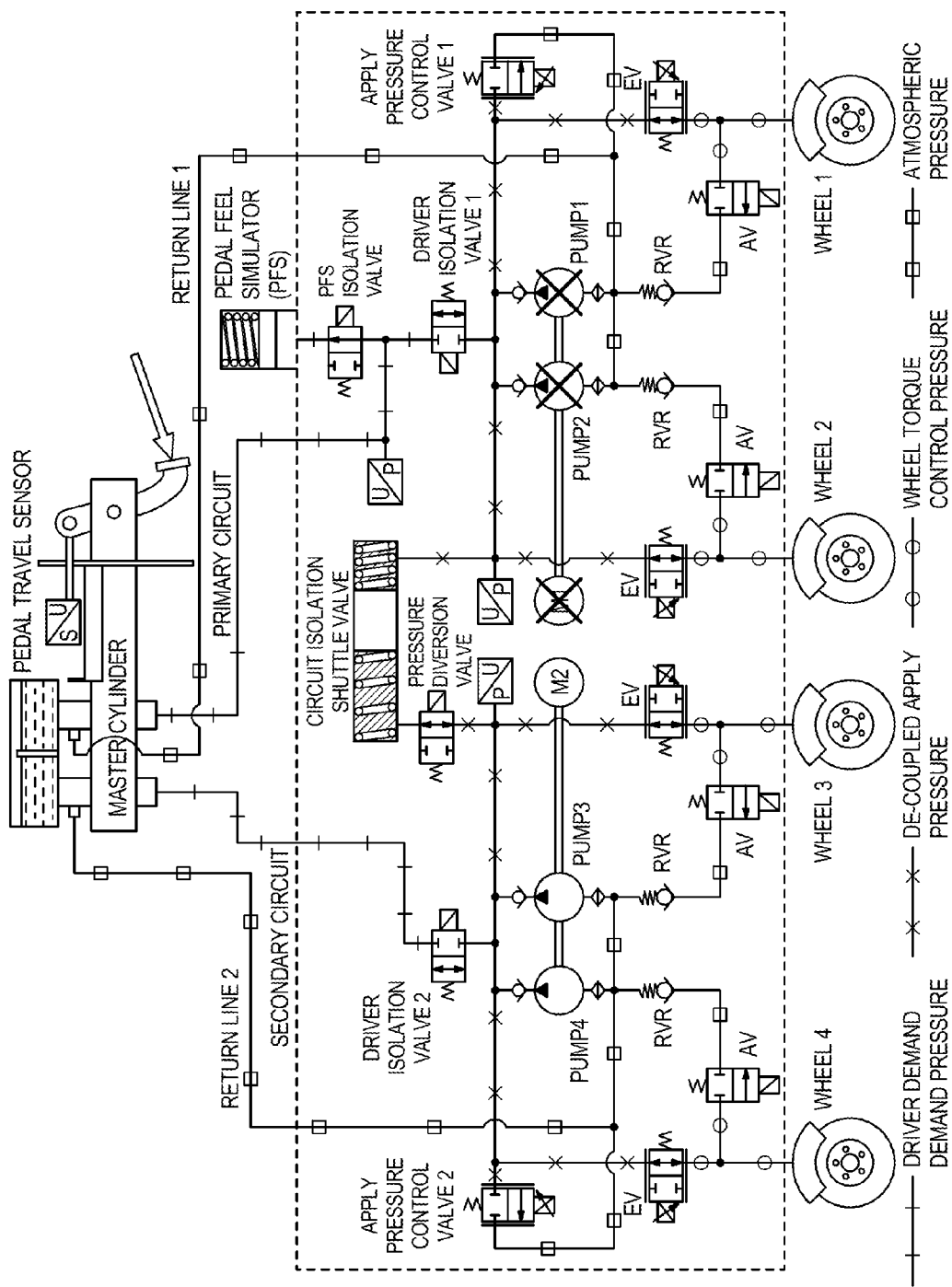
FIG. 8 is a schematic drawing of the braking system of FIG. 5. The circuit isolation shuttle valve is re-stroked during failure of a primary circuit motor.

FIGS. 5-9 illustrate a braking system 100A according to another construction, which is similar in many respects to the braking system 100 of FIGS. 1-4. Components and functions of the braking system 100A not specifically discussed below will be understood to correspond to the description of the braking system 100 provided above. The braking system 100A includes a means for transferring braking force (hydraulic fluid pressure), without actually transferring fluid, from a functional circuit to a non-functional circuit (i.e., a circuit with a failed pump 116 and/or motor M1, M2). In the illustrated construction, a circuit isolation shuttle valve 140 is provided in communication with the pressure side of the pumps 116 of the first circuit and in communication with the pressure side of the pumps 116 of the second circuit. Thus, the inlet valves EV for all wheel cylinders 110 are coupled to one side or the other of the circuit isolation shuttle valve 140. A shuttle within the valve 140 is biased to a central position by two biasing members. A normally-closed pressure diversion valve 142 (e.g., a switched solenoid valve) is provided adjacent the circuit isolation shuttle valve 140 in fluid communication with one of the ports thereof so that the pressure diversion valve 142 normally prevents any movement of the shuttle, and thus any transfer of braking force between the two separate circuits through the circuit isolation shuttle valve 140. FIGS. 6-8 illustrate an exemplary operation method of the braking system 100A, utilizing the circuit isolation shuttle valve 140 to provide boosted braking in a failed circuit.

As shown in FIG. 6, the motor M1 and pumps 116 in the primary circuit are in a non-operational state. Upon identifying this failure, the pressure diversion valve 142 is actuated to an open state which establishes fluid communication between the circuit isolation shuttle valve 140 and the pressure side of the operational pumps 116 of the secondary circuit. Thus, boosted braking pressure in the secondary circuit can be "shared" with the primary circuit as the shuttle moves within the valve 140 against the bias of the biasing member on the primary circuit side. In some cases, the shuttle within the circuit isolation shuttle valve 140 may bottom out or run out of travel before the pressure in the failed primary circuit has reached the desired apply pressure (the pressure present in the fully operational secondary circuit), as illustrated in FIG. 6. However, the system 100A can be configured to carry-out additional stroking of the circuit isolation shuttle valve 140 as shown in FIGS. 7 and 8 to further increase the pressure in the failed primary circuit, up to the desired apply pressure that is present in the secondary circuit.

Figure 9:
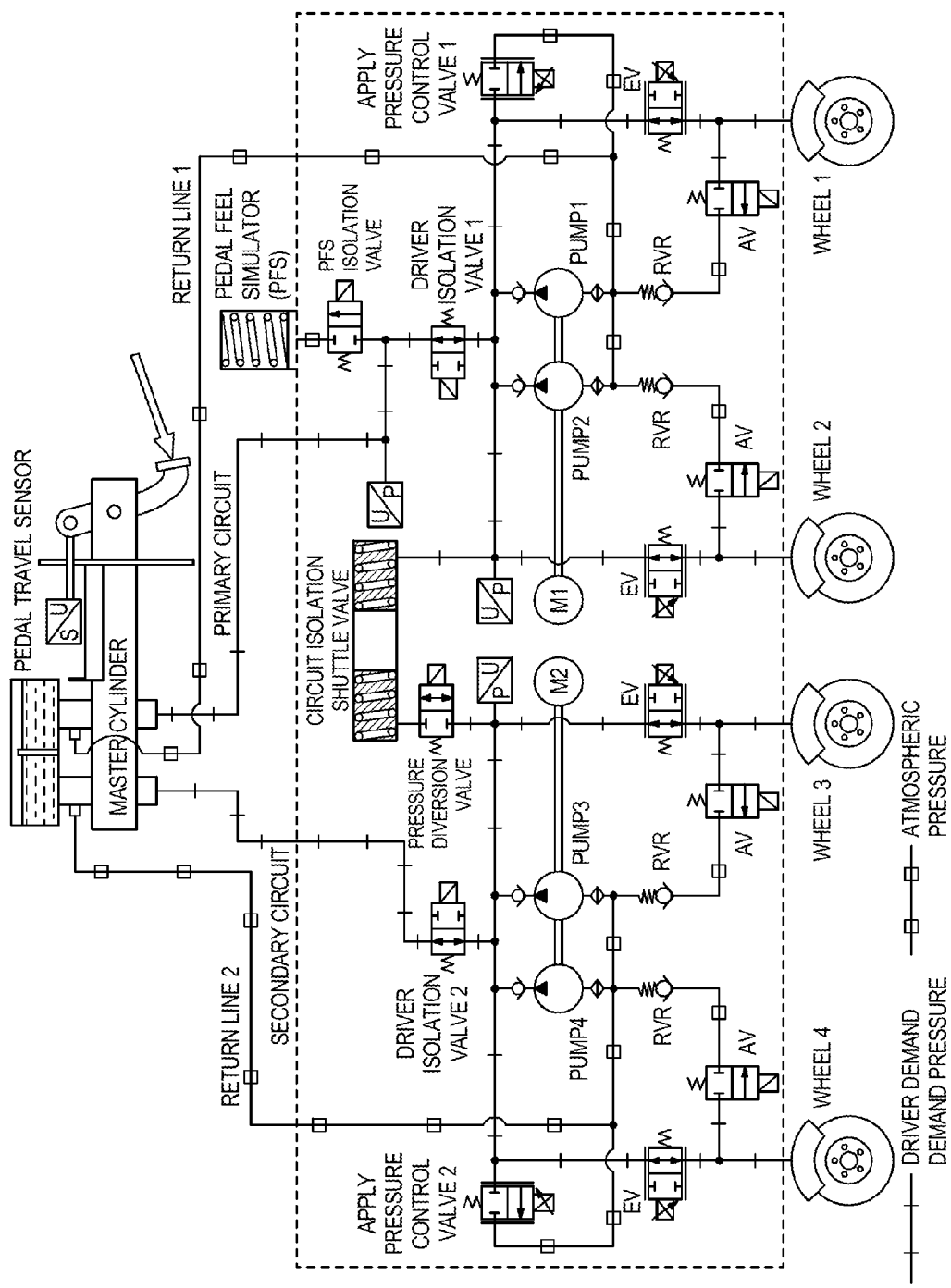
FIG. 9 is a schematic drawing of the braking system of FIG. 5. A braking mode for a full power failure is illustrated.

In order to re-stroke the circuit isolation shuttle valve 140, its shuttle must first be returned to the central or nominal position. This is done by closing all inlet valves EV to trap pressure at the wheel cylinders 110 and then reducing the apply pressure in the functional secondary circuit to zero (i.e., by opening the apply pressure control valve 120) as shown in FIG. 7, which allows the biasing member on the primary side of the circuit isolation shuttle valve 140 to restore the shuttle to the nominal position. With both circuits back to atmospheric pressure, pressure can again be built up in the secondary circuit and added to the pressure previously held at the wheel cylinders 110, when the inlet valves EV are again opened. With the pressure diversion valve 142 open, pressure built in the secondary circuit is again shared with the failed primary circuit as the circuit isolation shuttle valve 140 is re-stroked (FIG. 8). This process can be repeated as necessary to achieve a target apply pressure or pressure match between the operational circuit and the failed circuit. Of course, the same procedure can take place in mirrored fashion, when the secondary circuit fails and the primary circuit remains operational. Thus, boosted braking is not limited to one circuit, even when a complete failure of the boosting components (motor and pump(s)) occurs in the other circuit. In some constructions, the pressure diversion valve 142 can be a modulated valve having a range of open positions or being pulse-width modulated to achieve a similar effect, with the result that more precise control can be provided for the pressure from the operational circuit that is "shared" to the failed circuit. FIG. 9 illustrates that the braking system 100A has a failsafe condition similar to that of the system 100.

It should also be noted that the "sharing" of fluid between circuits with the circuit isolation shuttle valve 140 is not just restricted to use in compensating for a failed circuit. Rather, fluid sharing via the circuit isolation shuttle valve 140 can be a strategy in the initial design, which could for example, enable down-sizing of the pumps 116 and/or motors M1, M2 for each of the circuits. This may be advantageous to provide a lower cost without sacrificing pressure build dynamics in the system.

Figure 10:
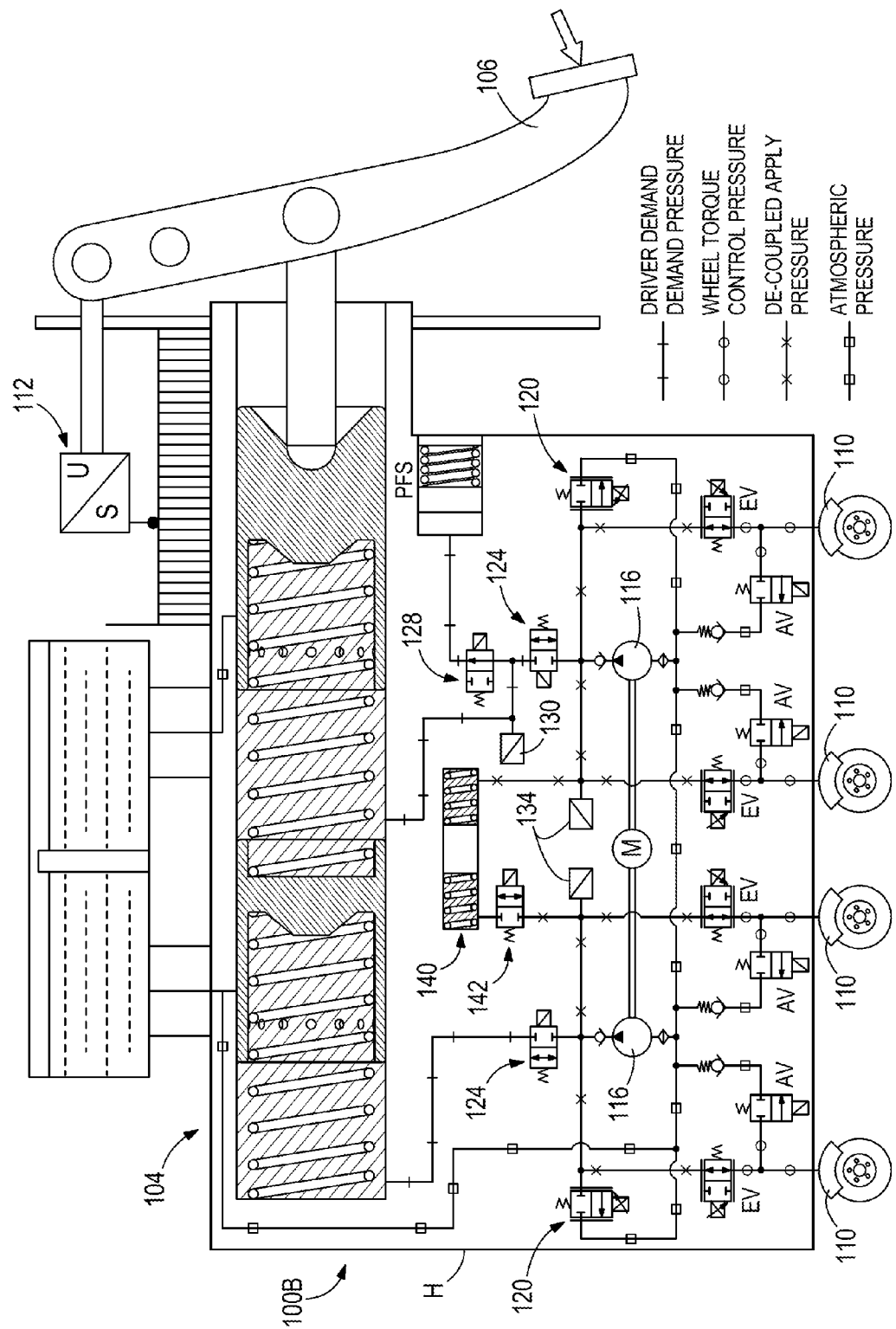
FIG. 10 is a schematic drawing of a braking system according to one aspect of the present invention, including a circuit isolation shuttle valve, a shared motor for the pumps of the primary and secondary circuits, and a shared return line. A normal braking mode is illustrated.

In one alternate configuration shown in FIG. 10, a braking system 100B can be provided similar to the system 100A, but having a single motor M which drives one or more pumps 116 of the primary circuit and one or more pumps 116 in the secondary circuit. The primary and secondary circuits also share a single return line coupling both apply pressure control valves 120 to the reservoir (at atmospheric pressure). Because the braking system 100B is highly space-efficient, all valves, motor(s), pumps, and the pedal feel simulator PFS, and optionally even including the master cylinder 104 and its piston(s), may be provided in a single common housing H. Although only illustrated with the construction of FIG. 10, the use of the single common housing H may be applied to other constructions. It should also be noted that, unless specifically precluded, features illustrated in one construction may be applicable to other constructions, resulting in additional combinations that need not be particularly illustrated and discussed to be appreciated by one of ordinary skill in the art.

Figure 15:
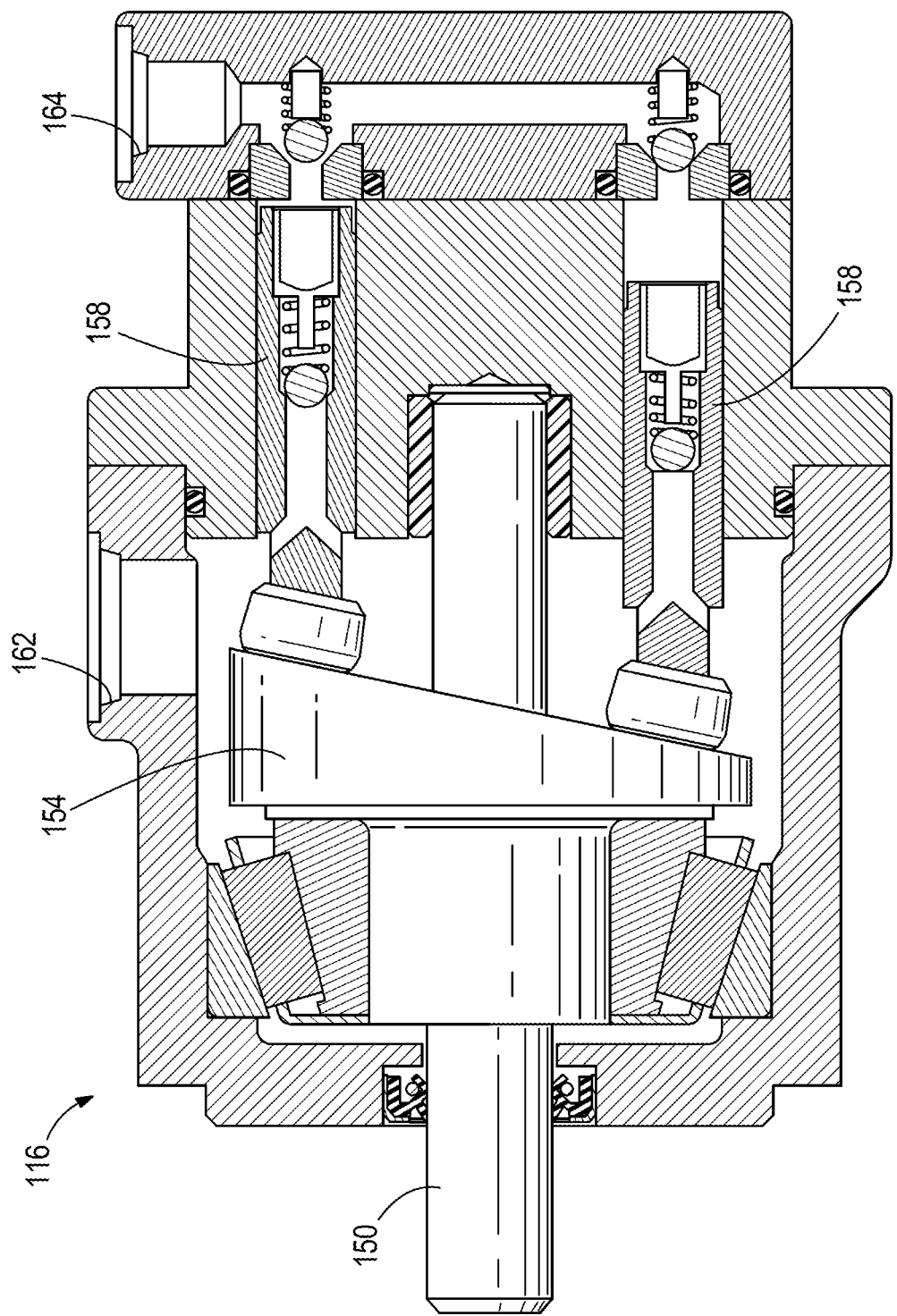
FIG. 15 is a cross-section view of a radial piston pump.

The pump elements utilized in the brake systems of the present invention can be of any number of designs, including gear pumps to reduce noise, vibration, and harshness. The pump-driving motor(s) can likewise be of the brushless type. In some constructions, the pumps are axial piston pumps having a construction as shown in FIG. 15. Each pump 116 includes a motor input shaft 150 coupled to an angled swash plate 154. The swash plate 154 drives a plurality of pistons (i.e., pump elements) 158 to be reciprocated in a smooth, quiet manner. The pistons 158 are oriented parallel to the rotational axis of the motor input shaft 150. A low pressure inlet 162 is in fluid communication with the swash plate 154 and a first side of the pistons 158. A high pressure outlet 164 is in fluid communication with the second side of the pistons 158. The brake systems described herein may be used in a variety of vehicles, including those with conventional internal combustion engines, direct injected internal combustion engines, hybrid drive trains having both an internal combustion engine and an alternative drive source (e.g., electric, hydraulic), and full electric drive trains, among others.

What is claimed is:

1. A vehicle braking system comprising:
   a master cylinder configured to receive an input from a brake pedal, the master cylinder having an outlet for a primary circuit including at least one wheel cylinder operable to provide a braking force on a wheel when supplied with pressurized hydraulic fluid, and an outlet for a secondary circuit including at least one wheel cylinder operable to provide a braking force on a wheel when supplied with pressurized hydraulic fluid;
   a pressure sensor operable to detect an actual, non-boosted driver demand pressure generated at one of the master cylinder outputs from depression of the brake pedal;
   at least one pump provided in each of the primary circuit and the secondary circuit, the at least one pump defining a pressure side and a suction side of each of the respective primary and secondary circuits;
   an inlet valve positioned adjacent each wheel cylinder on the pressure side of each of the primary circuit and the secondary circuit;
   an outlet valve positioned adjacent each wheel cylinder on the suction side of each of the primary circuit and the secondary circuit;
   a normally open isolation valve positioned between each master cylinder output and the pressure side of the respective primary circuit and the secondary circuit, each isolation valve being movable between an open position that allows fluid communication and a closed position that blocks fluid communication;
   a pedal feel simulator configured to receive hydraulic fluid from the master cylinder to provide a reaction force to the brake pedal when the isolation valves of the primary and secondary circuits are closed;
at least one motor operable to drive the pumps of the primary and secondary circuits to generate hydraulic fluid pressure in the pressure side for supplying to the respective wheel cylinders through the respective inlet valves;
a normally closed apply pressure control valve positioned in each of the primary circuit and the secondary circuit between the pressure side and the suction side of the respective circuit, each apply pressure control valve being movable between a closed position in which the full hydraulic fluid pressure at the pressure side is provided to the respective inlet valve and an open position in which the pressure provided to the respective inlet valve is reduced in comparison to that at the pressure side; and
a controller operable to receive a signal from the pressure sensor and generate corresponding control signals for the at least one motor and the apply pressure control valves of each of the primary and secondary circuits to produce a hydraulic fluid pressure in the pressure side of each of the primary and secondary circuits equal to the sensed driver demand pressure plus a predetermined boost factor, the actual pressure at each wheel cylinder being configured for individual manipulation by selective opening and closing of the associated inlet and outlet valves.

2. The vehicle braking system of claim 1, wherein the at least one pump of the primary and the at least one pump of the secondary circuit are driven by a single motor.

3. The vehicle braking system of claim 2, wherein the at least one pump element for each circuit, the inlet valves and outlet valves for all wheel cylinders, the isolation valves, and the apply pressure control valves are all provided within a common housing.

4. The vehicle braking system of claim 1, further comprising a circuit isolation valve having a first side in fluid communication with the pressure side of the primary circuit and a second side in fluid communication with the pressure side of the secondary circuit, the circuit isolation valve having a shuttle biased to a central position and movable against a bias force in either direction in response to exposure to a pressure differential, the shuttle of the circuit isolation valve being selectively exposed to a potential pressure differential between the pressure sides of the primary and secondary circuits by a normally closed diversion valve.

5. The vehicle braking system of claim 4, wherein the at least one pump element for each circuit, the inlet valves and outlet valves for all wheel cylinders, the isolation valves, the circuit isolation valve, the diversion valve, and the apply pressure control valves are all provided within a common housing.

6. The vehicle braking system of claim 1, wherein there is no accumulator device in the system for storing pressurized hydraulic fluid pressurized by the pumps.

7. The vehicle braking system of claim 1, wherein each of the primary and secondary circuits includes multiple wheel cylinders, and the pressure side and the suction side defined by the at least one pump of each circuit is shared by all wheel cylinders of the respective circuit.

8. The vehicle braking system of claim 1, wherein the apply pressure control valves are modulated solenoid valves.

9. A method of operating a vehicle braking system, the method comprising:

providing a primary circuit including at least one wheel cylinder operable to provide a braking force on a wheel when supplied with pressurized hydraulic fluid and a secondary circuit including at least one wheel cylinder operable to provide a braking force on a wheel when supplied with pressurized hydraulic fluid, the primary and secondary circuits being in selective fluid communication with respective outputs of a master cylinder;
providing an inlet valve positioned adjacent each wheel cylinder on a pressure side of each of the primary circuit and the secondary circuit and an outlet valve positioned adjacent each wheel cylinder on a suction side of each of the primary circuit and the secondary circuit;
receiving an input from a brake pedal at the master cylinder;
isolating the pressure side of both the primary and secondary circuits from the master cylinder outputs and establishing fluid communication between at least one of the master cylinder outputs and a pedal feel simulator;
detecting an actual, non-boosted driver demand pressure generated at one of the master cylinder outputs from depression of the brake pedal;
operating at least one pump provided in each of the primary circuit and the secondary circuit and modulating a normally closed apply pressure control valve positioned in each of the primary circuit and the secondary circuit with respective signals corresponding to the detected driver demand pressure to produce a hydraulic fluid pressure in the pressure side of each of the primary and secondary circuits equal to the sensed driver demand pressure plus a predetermined boost factor; and
modulating the actual pressure at at least one individual wheel cylinder by selective opening and closing of the associated inlet and outlet valves.

10. The method of claim 9, wherein the actual pressure at the at least one individual wheel cylinder is modulated to accommodate blending the hydraulic braking of the braking system with another braking source coupled to a wheel of the vehicle.

11. The method of claim 9, further comprising driving the at least one pump of the primary and the at least one pump of the secondary circuit with a single motor.

12. The method of claim 9, further comprising detecting a failure in one of the primary and secondary circuits and sharing pressure from the other of the primary and secondary circuit by opening a normally closed diversion valve to expose a circuit isolation shuttle valve to both the pressure side of the primary circuit and a pressure side of the secondary circuit.

13. The method of claim 12, further comprising re-stroking the circuit isolation shuttle valve by closing all of the inlet valves to trap pressure at the wheel cylinders, then opening the apply pressure control valve of the non-failed circuit to reduce the pressure at the pressure side allowing a shuttle of the circuit isolation shuttle valve to return to a central position, then re-building pressure at the pressure side of the non-failed circuit with the at least one pump for supplementing the trapped pressure at the wheel cylinders.

14. The method of claim 9, wherein each of the primary and secondary circuits is provided with multiple wheel cylinders, the method further comprising sharing the hydraulic fluid pressure produced in the pressure side of each of the primary and secondary circuits among all wheel cylinders of the respective circuit.

15. The vehicle braking system of claim 1, further comprising a master cylinder fluid reservoir, wherein a pressure side of the pump of the primary circuit and a pressure side of the pump of the secondary circuit are selectively coupled to the master cylinder fluid reservoir through the respective apply pressure control valves.

16. The vehicle braking system of claim 1, wherein the primary and secondary circuits are independent from each other with respect to fluid separation therebetween.

17. The method of claim 9, wherein modulating the normally closed apply pressure control valves positioned in the primary and secondary circuits includes selectively establishing fluid communication between a pressure side of the pump of the primary circuit and a pressure side of the pump of the secondary circuit with a master cylinder fluid reservoir through the respective apply pressure control valves.

* * * * *